April 14, 1959  W. R. COBB  2,881,805
PIPE SEAL ASSEMBLIES
Filed May 1, 1956
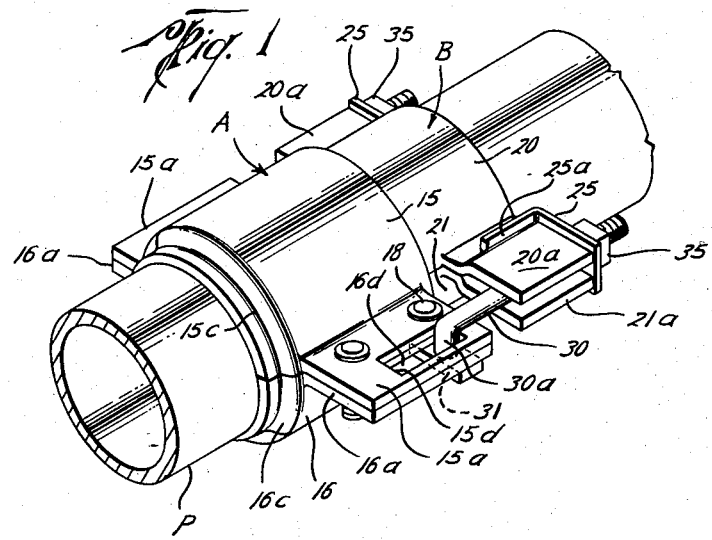
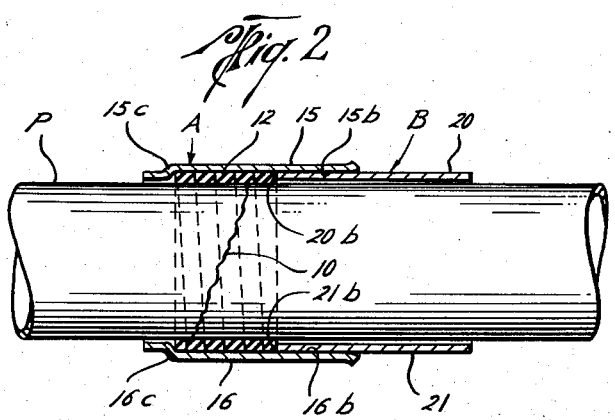
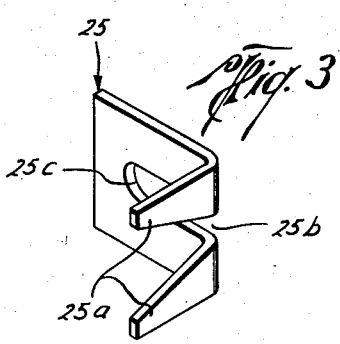
William R. Cobb
INVENTOR.
BY J. Vincent Martin
Joe E. Edwards
B. R. Pravel
ATTORNEYS

United States Patent Office 2,881,805
Patented Apr. 14, 1959

2,881,805

PIPE SEAL ASSEMBLIES

William R. Cobb, Houston, Tex.

Application May 1, 1956, Serial No. 581,981

2 Claims. (Cl. 138—99)

This invention relates to new and useful improvements in pipe seal assemblies.

An object of this invention is to provide a new and improved pipe seal assembly which is adapted to be connected to a pipe to seal around a fracture or other defect in the pipe without removing the pipe from its normal position.

An important object of this invention is to provide a new and improved pipe seal assembly for use with pipe laid underground wherein said seal is applied to the external surface of the pipe at a fracture or other defect to prevent any leakage from the interior of the pipe, and wherein said seal is applied while the pipe remains in its underground position with the portion of the pipe having the fracture or other defect being exposed for applying said seal.

Another object of this invention is to provide a new and improved pipe seal assembly which has a sealing material for positioning around the external surface of the pipe at a fracture or other defect, and which also has coacting sleeves for confining and compressing said sealing material to provide a fluid-tight seal for preventing leakage of fluid through said fracture or other defect.

A further object of this invention is to provide a new and improved pipe sealing assembly for attachment to the external surface of a pipe at a fracture or other defect located remote from a pipe joint and where the pipe has the same or substantially the same external diameter on each side of the fracture or other defect; said seal assembly having a sealing material which is applied thereto under compression to prevent leakage of fluid through said fracture or other defect.

The construction designed to carry out the invention will be hereinafter described, together with other features thereof.

The invention will be more readily understood from a reading of the following specification and by reference to the accompanying drawings forming a part thereof, wherein an example of the invention is shown and wherein:

Figure 1 is an isometric view of the pipe seal assembly of this invention in position on a pipe.

Figure 2 is a view, partly in elevation and partly in section, illustrating the interior of the pipe sealing of this invention.

Figure 3 is an isometric view of one of the forked connecting members used with the sealing assembly of this invention.

In the drawings, the letter P designates a pipe having a fracture 10 or other defect therein which results in the leakage of fluid from the interior of the pipe P. The pipe sealing assembly of this invention includes basically sealing material 12 which is wrapped spirally around the pipe P over the fracture 10 or other defect. Such sealing material 12 is formed of rubber or other similar compressible elastic material. The sealing material 12 is confined and compressed into a fluid-tight sealing engagement with the external surface of the pipe P to cover the fracture 10 or other defect by means of split sleeves A and B which, as will be explained, are movable relative to each other and with respect to the pipe P to accomplish such fluid-tight sealing engagement of the sealing material 12 with the external surface of the pipe P.

Considering the details of the pipe sealing assembly of this invention, the clamping sleeve A is composed of an upper shell 15 and a lower shell 16. The upper shell 15 is semi-cylindrical and has the flanges 15a extending laterally therefrom on each side of the pipe P. Similarly, the lower shell 16 is semi-cylindrical and has lateral flanges 16a on each side of the pipe P. The upper shell 15 and the lower shell 16 are connected together with bolts 18 having nuts (not shown) threaded thereon for holding the flanges 15a and 16a on each side of the pipe P together so that the upper shell 15 and the lower shell 16 together form the annular sleeve A. The internal diameter of the annular sleeve A is greater than the external diameter of the pipe P and therefore an annular space is provided between the internal surface 15b and 16b of the shells 15 and 16, respectively, and the external surface of the pipe P. The annular space so formed between the sleeve A of the pipe P is normally substantially filled with the packing material 12 which is of course previously wrapped around the pipe P prior to the assembly of the shells 15 and 16 in position around the material 12. Thus, the sleeve A serves to confine the packing material 12 against movement outwardly away from the pipe P.

The upper shell 15 has a shoulder 15c formed therewith which extends inwardly to a point in engagement with, or substantially in engagement with, the external surface of the pipe P. Similarly, the lower shell 16 is provided with the same type of shoulder 16c so that together the shoulders 15c and 16c form an annular shoulder against which one end of the spirally-wrapped sealing material 12 engages. Thus, as viewed in Figure 2, the sealing material 12 is limited in its movement relative to the pipe P by its engagement with the annular shoulder provided by the shoulders 15c and 16c.

The clamping sleeve B is also formed of an upper shell 20 and a lower shell 21, each of which is substantially semi-cylindrical so that the two sections or shells 20 and 21 together form an annular sleeve which fits about the pipe P and which has an external diameter which is slightly less than the internal diameter of the sleeve A. One end of the sleeve B extends into the bore of the sleeve A for engagement with the annular end of the sealing material 12 which is opposite from the annular shoulder provided by the shoulders 15c and 16c. Therefore, since the packing material 12 is confined against movement in the direction of the shoulders 15c and 16c (to the left in Figure 2), upon a movement of the sleeve B to the left and relative to the sleeve A, the adjacent edges or sides of the sealing material 12 are urged into fluid-tight contact with each other and the inner surfaces of the sealing material 12 are compressed into fluid-tight sealing engagement with the external surface of the pipe P.

The upper section or shell 20 of the clamping sleeve B is provided with lateral flanges 20a and the lower section or shell 21 is similarly provided with flanges 21a therebelow. Such flanges 20a and 21a are spaced from each other as shown in Figure 1 for a purpose to be hereinafter described. The flanges 20a and 21a on each side of the pipe P are connected together so as to prevent their separation during use by means of forked connecting members 25 (Figures 1 and 3). As best seen in Figure 3, each of the forked connecting members 25 has prongs 25a which are separated by a space 25b which communicates with a slot 25c. The forked connecting members 25 are positioned on the flanges 20a and 21a, as indicated in Figure 1, so that one of the prongs 25a of each connecting member 25 is on the upper surface of the flange 20a and the other of the prongs 25a of such member 25 is below the lower surface of the flange 21a. Thus, the flanges 20a and 21a on each side are confined by the prongs 25a of each of the connecting members 25.

In order to move the sleeve B inwardly within the bore of the sleeve A to compress the sealing material 12, a force-applying means is provided for each side of the sealing assembly. Such force-applying means includes on each side of the assembly a bolt 30 which has a bent portion 30a to which the bolt head 31 is connected.

The bolt head 31 is of a special construction in that it is substantially rectangular in shape and it is adapted to pass through slots 15d and 16d formed in the flanges 15a and 16a, respectively. In other words, when the bolt head 31 is turned at an angle perpendicular to that shown in Figure 1, since it is of a smaller size than the slots 15d and 16d it can be readily passed therethrough so as to position same below the lower flange 16a. With the bolt head 31 positioned below the lower flange 16a, the bolt 30 can be turned from its position substantially perpendicular to the axis of the pipe P to its position parallel to the axis of the pipe P. With the bolt 30 substantially parallel to the axis of the pipe P, as shown in Figure 1, it extends through the slot 25c in the connecting member 25 on the same side of the pipe P. A nut 35 is threaded on the bolt 30 and it engages the connecting member 25 to urge it into engagement with the flanges 20a and 21a. The arrangement with the bolt 30 and the nut 35 is the same on each side of the pipe P, as illustrated in Figure 1. It can therefore be seen that when the nut 35 is in threaded engagement with the bolt 35 it serves to prevent displacement of the connecting member 25 from the flanges 20a and 21a. Also, upon a further tightening of the nut 35, the sleeves A and B are urged towards each other so that the packing material 12 can be tightened and distorted within the confined space between the annular shoulder provided by the shoulders 15c and 16c and the ends 21b and 20b of the shells 21 and 20.

In the use or operation of the pipe seal assembly of this invention, such assembly is normally applied to a section of pipe P which is disposed underground. The area of the pipe P which has the fracture 10 or other defect is exposed by digging around the pipe so as to leave an open hole completely around the pipe P. However, the pipe P does not have to be disconnected and it is unnecessary to take any section of the pipe P from its position. Also, the assembly of this invention can be applied whether or not the hole in the ground around the exposed portion of the pipe P is filled with water or is empty. This is an extreme advantage since it eliminates the necessity for pumping the water from the area around the pipe P.

Assuming, therefore, that a hole has been obtained around the portion of the pipe P which has the fracture 10, the sealing material 12 is first wrapped spirally around the pipe P to cover the fracture 10 or other defect in the pipe P. Then, the lower shell or section 16 is positioned underneath the pipe P to cover the lower half of the sealing material 12. The upper shell 15 is then positioned directly above the lower shell 16 and is connected thereto with bolts 18 and suitable nuts threaded thereon. It will be evident that bolts 18 are provided for the flanges 15a and 16a on each side of the pipe P even though the bolts 18 on only one side of the pipe P are visible in Figure 1. Such bolts 18 hold the separate sections or shells 15 and 16 together to form the annular sleeve A which confines the packing or sealing material 12 around the pipe P. The lower section or shell 21 of the clamping sleeve B is then positioned underneath the pipe P and is slipped into the annular space between the external surface of the pipe P and the internal surface 16b of the lower section 16. Similarly, the upper shell 20 is positioned above the lower section 21 and is slipped into the annular space or bore between the external surface of the pipe P and the internal surface 15b of the upper shell or section 15.

The bolts 30 are next positioned with their bolt heads 31 below the flanges 16a, as shown in Figure 1, by first positioning each of the bolts 30 substantially perpendicular to the axis of the pipe P so that the bolt head 31 thereof passes downwardly through the slots 15d and 16d. Then the bolt 30 is turned to a position substantially parallel to the axis of the pipe P on each side of the pipe P. The connecting member 25 on each side is then placed in position with its prongs 25a above and below the flanges 20a and 21a, respectively, and with the bolt 30 extending through the slot or opening 25c. The nut 35 is threaded onto the bolt 30 on each side of the pipe P to tighten same against the connecting member 25 to permit displacement of same. Subsequent rotation of the nuts 35 pulls or forces the sleeve B further inwardly within the bore of the sleeve A so as to compress the packing or sealing material 12 in the fluid-tight sealing engagement with the external surface of the pipe P to prevent the passage or leakage of fluid through the fracture 10 or other defect in the pipe P.

It can be readily seen that the pipe sealing assembly of this invention can be applied to the pipe P at a point remote from the pipe joints and where the pipe P is of substantially the same diameter. The construction is relatively simple and permits convenient and rapid sealing of a leak in a pipe P without requiring any pumping of the fluid or liquid from the area around the pipe P, as previously explained. The disassembly or disconnection of the assembly from the pipe P can be readily effected by reversing the above-described sequence of steps, as will be readily understood.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A pipe seal assembly for a pipe comprising, compressible sealing material wrapped about a pipe, a first clamping sleeve surrounding said sealing material and having an upper shell and a lower shell, said shells each having lateral flanges extending outwardly from each side of said pipe, means connecting the lateral flanges of the upper shell and the lower shell on each side of said pipe, a second clamping sleeve surrounding said pipe and having one end thereof in engagement with the sealing material, said second clamping sleeve being formed by an upper shell and a lower shell, said shells of said second sleeve each having lateral flanges extending outwardly from each side of said pipe, the outer ends of said lateral flanges of the upper and lower shells of said second sleeve on each side of the pipe being vertically spaced from each other to provide an opening therebetween extending parallel to the axis of the pipe, a substantially L-shaped connecting member having one leg thereof formed with spaced prongs adapted to extend substantially parallel to the axis of the pipe for engagement with the flanges of the second sleeve on each side of the pipe for preventing the movement of the shells of the second sleeve away from each other, each said connecting member having its other leg extending perpendicular to the axis of the pipe and formed with an opening therethrough positioned in alignment with the vertical space between said lateral flanges on said second clamping sleeve, a bolt extending from the flanges of said first clamping sleeve on each side of the pipe through the space between said flanges on the second clamping sleeve on the same side of the pipe and through said opening in said connecting member, and a nut on each bolt engageable with said other leg of each said connecting member for retaining each said connecting member on said lateral flanges of said second clamping sleeve, said first and second clamping sleeves being movable toward each other and relative to the pipe upon a threading of each nut on each bolt to compress the sealing material into fluid-tight sealing engagement with the external surface of the pipe.

2. The structure set forth in claim 1, wherein said lateral flanges on each side of said first clamping sleeve are formed with aligned elongate holes which are longer in a direction parallel to the axis of the pipe than in a direction perpendicular thereto, and wherein each of said bolts is provided with an elongate bolt head which is adapted to pass through said holes when the shank thereof is substantially perpendicular to the axis of the pipe but is prevented from passing therethrough when the shank is substantially parallel to the axis of the pipe.

References Cited in the file of this patent

UNITED STATES PATENTS

| | | |
|---|---|---|
| 443,952 | Baguley | Dec. 30, 1890 |
| 624,770 | Eibee | May 9, 1899 |
| 1,478,172 | Clark | Dec. 18, 1923 |
| 1,911,126 | Pfefferle | May 23, 1933 |
| 2,120,961 | Beede | June 21, 1938 |
| 2,173,399 | Mills | Sept. 19, 1939 |
| 2,361,186 | Fishbein et al. | Oct. 24, 1944 |
| 2,424,542 | Adams | July 29, 1947 |
| 2,438,234 | Stewart | Mar. 23, 1948 |